(12) United States Patent
Kreuzer

(10) Patent No.: US 6,419,983 B1
(45) Date of Patent: Jul. 16, 2002

(54) METHOD OF INTRODUCING AND REMOVING WORKPIECES, PARTICULARLY VEHICLE BODIES, AN APPARATUS AND SYSTEM FOR THE SURFACE TREATMENT OF WORKPIECES

(75) Inventor: Bernd Kreuzer, Lautabach-Maar (DE)

(73) Assignee: ABB Fläkt Aktiebolag, Stockholm (SE)

( * ) Notice: Subject to any disclaimer, the term of this patent is extended or adjusted under 35 U.S.C. 154(b) by 0 days.

(21) Appl. No.: 09/285,513

(22) Filed: Apr. 2, 1999

Related U.S. Application Data

(63) Continuation of application No. PCT/EP97/05394, filed on Oct. 1, 1997.

(51) Int. Cl.[7] ................................................. B05D 3/12
(52) U.S. Cl. ........................ 427/242; 427/435; 427/425; 118/416; 118/322
(58) Field of Search ........................... 118/52, 309, 416, 118/320, 322, 425, 426, 428; 198/377.02, 377.06, 416, 320, 322, 425, 426, 428; 427/425, 346, 231, 242, 435

(56) References Cited

U.S. PATENT DOCUMENTS

| | | |
|---|---|---|
| 2,598,163 A | 5/1952 | Collins |
| 2,658,008 A | 11/1953 | Williams et al. |
| 4,874,639 A | * 10/1989 | Matsui et al. |
| 5,094,183 A | * 3/1992 | Hamasaki |
| 5,686,148 A | * 11/1997 | Suzuki |
| 5,725,669 A | 3/1998 | Heckmann |

FOREIGN PATENT DOCUMENTS

| | | |
|---|---|---|
| DE | 1922751 | 11/1970 |
| DE | 2512762 | 9/1976 |
| DE | 2901027 | 7/1980 |
| DE | 3217553 | 10/1983 |
| DE | 4304145 | 4/1994 |
| DE | 4410477 | 9/1995 |
| DE | 4432352 | 3/1996 |
| EP | 0278482 | 8/1988 |
| EP | 0683699 | 8/1997 |
| GB | 1019887 | 2/1966 |
| GB | 1434348 | 5/1976 |

* cited by examiner

*Primary Examiner*—Brenda A. Lamb
(74) *Attorney, Agent, or Firm*—Dilworth & Barrese, LLP

(57) ABSTRACT

The invention relates to a method of introducing and removing workpieces, particularly vehicle bodies, into and out of a treatment area (20, 70) suitable for the surface treatment of the workpieces (1), wherein the workpieces (1) are detachably secured to mounting frames (7) that each have a rotary axis (13, 41, 61) aligned transverse to the direction of movement of the workpieces (1), the rotary axes (13, 41, 61) are continuously moved translationally and at a constant speed, and the workpieces (1) at the start and end of the treatment area (20, 70) are simultaneously rotated through about 180° around one of these rotary axes (13, 41, 61) in a controlled and always guided manner in the direction of the translational movement. The invention also relates to a device for the surface treatment of workpieces and a system for the surface treatment of vehicle bodies.

25 Claims, 9 Drawing Sheets

Figure 1:
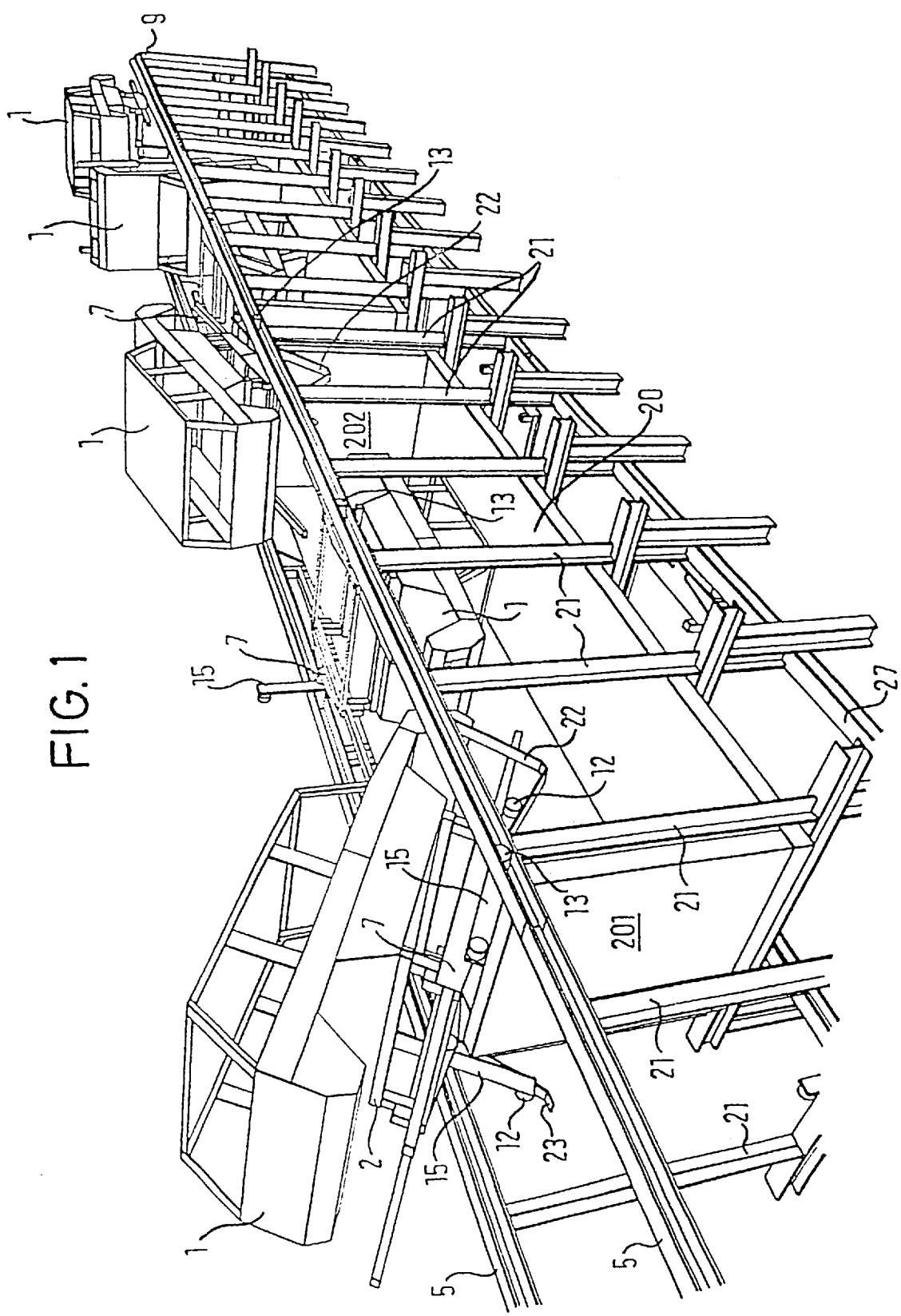

METHOD OF INTRODUCING AND REMOVING WORKPIECES, PARTICULARLY VEHICLE BODIES, AN APPARATUS AND SYSTEM FOR THE SURFACE TREATMENT OF WORKPIECES

This is a continuation of copending application Ser. No. PCT/EP97/05394 filed Oct. 1, 1997.

BACKGROUND OF THE INVENTION

1. Technical Field

The invention relates to a method of introducing and removing workpieces, particularly vehicle bodies, into or out of a tank or a treatment booth, whereby the workpieces inside the tank are treated either in a gaseous environment such as being coated with powder or wet paint, or the tank is a dip tank filled with a liquid medium suitable for the surface treatment of the workpieces. The invention also relates to an apparatus for the surface treatment of workpieces and to a system for the surface treatment of vehicle bodies.

In the subject matter according to the invention, the workpieces or vehicle bodies are continuously moved in a translational manner toward a treatment area such as a treatment bath, a treatment booth etc. and are transported to and from the treatment area while maintaining this movement.

2. Prior Art

Devices for the surface treatment of one or more vehicle bodies are generally divided into continuous and non-continuous conveyors.

In the case of non-continuous conveyors, so-called cyclical systems, the vehicle bodies on object supports are sequentially transported over successively arranged dip tanks where they are stopped. Lifting or rotating devices are used to dip the vehicle bodies into a bath medium suitable for surface treatment and located in the dip tank, and the vehicle bodies are lifted out again once the process time is over. These systems manage without inlet and discharge areas, allowing the treatment bath dip tanks to be shorter than in the case of continuous conveyors. These systems can only be used, however, at small production rates because system capacity depends on the desired process time and is therefore considerably restricted. The application range of such systems is consequently limited.

A rotating device for cyclically operating systems is known from DE 43 04 145 C1 which discloses a rotating device securely mounted above a dip tank and to which at least one vehicle body can be secured. Rotation through approximately 180° of the rotating device causes a vehicle body to be dipped into a treatment bath and a further rotation causes it to be guided out.

In the case of continuously conveying systems, vehicle bodies are continuously transported along the aligned treatment baths and are guided into and out of the treatment bath using lowering and raising means into and out of the bath medium. Due to the continuous conveyance of these systems, a treatment bath's inlet and outlet areas have to be designed at an angle. Each dip tank therefore requires a longer inlet and discharge area, which causes a dip tank and hence the entire system to be considerably extended. The known lowering means likewise do not ensure that air pockets remain in the workpieces dipped in the treatment bath. Due to cavities entailed by the structural design, this problem arises to an extreme degree particularly when vehicle bodies are dipped into the treatment bath. In the prior art, additional steps are therefore absolutely essential in order to reduce air pockets. It is for example proposed in GB 1 434 348 to move to and fro a lowered vehicle body that is dipped into the treatment bath.

A continuous conveyor for guiding workpieces in galvanic metallization and chromium-plating plants is known from German published document DE-AS 25 12 762. The system known from this document relates to a revolving conveyor device that continuously transports the workpiece to be treated. When the conveyor device rotates, the workpieces are each automatically dipped into a tank, guided underneath it while continuing the movement, moved out of the tank and again dipped into the next tank. Various options are mentioned in order to cause the workpieces to be dipped in or lifted out.

On the one hand, workpiece holders are rotatable by cams or by ramps and surfaces that extend downwards at an angle. When such a workpiece holder continues to move, however, only the rotation is initiated, the further rotational process takes place in an uncontrolled manner merely under the influence of gravity. Such a device suffers from the drawback that heavier workpieces fall into a treatment bath in an uncontrolled manner, which is totally unsuitable for larger, much heavier and more sensitive workpieces such as vehicle bodies. The system described therein also specifically focuses upon a design having current carrying means which simultaneously serve as an actuator for initiating a workpiece holder's rotation. The rotational process which is uncontrolled and hence indefinite in terms of time and place also makes it impossible to minimize the individual dip tanks' inlet and outlet areas. The system disclosed therein does not aim thereat either.

Finally, a container rotation device is known from German published document DE-OS 29 01 027; in this device, containers., preferably bottle containers, are intended to be rotated automatically and without manual action. The device comprises conveyance means, drivers that are rotatably supported in a mount, and a curved control surface which controls the drivers such that they secure the containers. chain wheels connected to the drivers engage with gear teeth.

The arrangement is such that the chain wheels, drivers and containers are rotated as a result of engagement with the teeth. Only the rotation by means of chain wheels is disclosed in the device shown therein. The container is also intended to be rotated only in order that various container parts are more effectively accessible. An insertion or removal process as a result of rotation is neither depicted nor in any way implied.

SUMMARY OF THE INVENTION

Technical Problem

The technical problem upon which the invention is based is to provide a method and an apparatus for the surface treatment of workpieces, in which on the one hand the treatment areas can be minimized in terms of their dimensions, while on the other hand, high production rates can also be achieved.

Solution of the Technical Problem

This technical problem is solved by a method of introducing and removing workpieces, particularly vehicle bodies, into and out of a treatment area suitable for the surface treatment of said workpieces, wherein said work pieces are detachably secured on mounting frames which each have a rotary axis vertically aligned in relation to the direction of movement of said workpieces, said rotary axes are continuously moved translationally and at a constant speed, and said workpieces at the start and at the end of said treatment area are simultaneously rotated through about 180° around one of these rotary axes in a controlled and always guided manner in the direction of the translational movement.

An apparatus solving the above technical problem for the surface treatment of workpieces in treatment for baths or treatment booths, particularly for the surface treatment of vehicle bodies, comprises at least one mounting frame for receiving one or more workpieces, said frame being continuously moveable along a direction of movement of said workpieces predetermined by the arrangement of said treatment bath or said booth, having receiving means with which said workpiece can be detachably fitted to said mounting frame, and having a rotary axis disposed across the direction of movement, actuating means for rotationally shifting said mounting frame around its rotary axis, said actuating means and said mounting frame being constantly coupled together during the process of rotation so that the rotation is always controlled and guided, guidance means with which said mounting frame can be guided in the direction of movement, and drive means with which said mounting frame is continuously moveable in the direction of movement.

The technical problem is also solved by a system for the surface treatment of vehicle bodies comprising a plurality of successively arranged treatment baths, a supply means for supplying said vehicle bodies individually in an inlet area, a device for the surface treatment of workpieces in said treatment baths, particularly for the surface treatment of vehicle bodies, with at least one mounting frame for receiving one or more workpieces, said frame being continuously moveable along a direction of movement of said workpieces predetermined by the arrangement of said treatment bath or said booth, having receiving means with which said workpieces can be detachably fitted to said mounting frame, and having a rotary axis disposed across the direction of movement, actuating means for rotationally shifting said mounting frame around its rotary axis, said actuating means and said mounting frame being constantly coupled together during the process of rotation so that the rotation is always controlled and guided, guidance means with which said mounting frame can be guide in the direction of movement, and drive means with which said mounting frame is continuously moveable in the direction of movement, wherein said plurality of spaced apart mounting frames is continuously moved above said plurality of successively arranged treatment baths, wherein the vehicle bodies are individually supplied in said inlet area by said supply means in accordance with the movement speed of said mounting frames, and wherein in an outlet area of said system, the now treated vehicle bodies are detached and can be removed, from said mounting frames by detachment means while continuously moving said frames.

Such a system is also usable in connection with treatment booths instead of treatment baths.

The invention is based on the idea of rotating the workpieces to be introduced into the treatment areas, during a continuous movement of these workpieces, at the boundary area of a treatment area at the same time as a controlled and completely guided rotational movement around a rotary axis across the workpieces' continuous direction of movement. As a result of this first ever co-ordination of the workpieces' continuous movement along the treatment areas and the simultaneous completely guided rotational movement thereof around the rotary axis located across the direction of conveyance, the workpieces, particularly vehicle bodies, can be rotated into and out of a treatment area with such accuracy that the inlet and outlet areas of each treatment area can be provided with vertical or almost vertical end walls. The length of each individual treatment area can therefore be reduced to a minimum. At the same time, this minimizes the total length of a system that has a plurality of successively arranged treatment areas and particularly a number of treatment baths arranged in a row. This reduction is about 20% for a capacity of one hundred vehicle bodies per hour compared to conventional continuous conveying systems. The advantages of a continuous conveying system are therefore combined for the first time with a rotational device's benefits as known from the prior art.

In the case of a treatment bath composed of a liquid medium, air bubbles are largely avoided by the rotational process while the workpieces are being dipped. Even if the workpiece is dipped, the air pockets that may have been caused by the treatment process can also be reduced, however, by moving further the workpiece in the treatment bath. In addition, occlusions of dirt on horizontal surfaces are reduced because the vehicle bodies are rotated above and within the bath.

In the method according to the invention, all that has to be provided is a minimum safety gap between the workpiece to be introduced into the treatment area and the end walls of the treatment area or dip tank. To ensure a minimum total length of the treatment area, the rotational speed and speed of movement then have to be coordinated with one another, by taking the safety gap into consideration, such that after completion of the rotational process, while observing the safety gap, the front section of the workpiece is positioned at the first end wall and is positioned at the second end wall during the process of removal by rotation. In the prior art, this minimum safety gap has to be much larger, as for example in the chromium-plating system known in the prior art and in which a completely uncontrolled process of insertion by rotation occurs. By coordinating the speed of the translational movement and the speed of rotating the workpiece in and out, the workpiece's movement curve can be accurately predetermined and adapted to the shape of the treatment area to an optimum degree. The total length can therefore be kept to a minimum as well.

By keeping the rotational speed essentially constant, a steady movement curve can be achieved, which is particularly important in the case of heavier workpieces so as to achieve an even process of rotation in and out, because greater forces which do not permit an accurate movement sequence otherwise take effect when there are changes in angular velocity. For example when the heavy vehicle bodies placed on a mounting frame temporarily move further than desired during rotation in and out due to inertia when there is a change in angular velocity.

The procedure according to the invention can be used for a wide variety of surface treatment techniques. For instance, the introduction and removal of workpieces into and out of a liquid medium is perfectly suited to performing dip coating. The procedure according to the invention is also, however, very well suited to powder coating or wet paint application. As with the treatment tanks needed for dip coating, the treatment booths envisaged for this purpose raise the problem of guiding the workpieces in and out of an inlet and outlet area of the booths. In consequence, these booths may be located above or below the workpieces' supply level.

Finally, the linking, according to the invention, of a continuous translational movement and a controlled and constantly guided rotary movement of the workpieces is also suitable for preventing the formation of fat edges in a dryer when workpieces have already been coated. For this purpose, instead of a gap between the rotary axis and the workpiece, the workpiece should be optimally arranged close to the rotary axis or even within the area of the rotary axis in the surface treatment apparatus according to the invention.

A mechanically very simply structured and low-maintenance design is obtained by providing the mounting frame with at least one laterally attached lever which interacts with a guide in order to cause the mounting frame to rotate. By adapting the lever length, heavy workpieces can also by rotated on a mounting frame in a very easily controlled manner.

Attaching at least one lever on opposite sides of a mounting frame—whereby these opposite levers are counterrotated by a predetermined angular amount—for the first time ensures that if the guidance devices are correspondingly designed, the mounting frame is always supported both in the forward direction and in the reverse direction in relation to the rotational direction and is therefore also accurately guided.

This effect can also be improved when two levers are disposed on each side of the mounting frame; these levers are each disposed on one side of the mounting frame symmetrical to the rotary axis and lever configurations on the opposite sides are rotated through 90°.

A very simple embodiment of the actuation means is obtained by designing it as a directional rail.

By providing guide surfaces on the directional rails in the inlet and outlet area of a treatment bath, i.e. in the boundary area, the rotation can be brought about by simply sliding corresponding devices up and down on the mounting frame or by rolling them off the frame.

Rotation is best controlled by upwardly or downwardly tilted guide portions which are inexpensive and easy to manufacture as a result of designing the individual guide portions to be simple and straight.

The individual guide portions are best tilted downwards through about 45°, other guide portions are tilted upwards through about 45°.

A low-friction and easy-maintenance design is obtained in that rollers which interact with the directional rails are disposed at the lever ends.

More complex, albeit extremely accurate actuation devices which can even be used with the heaviest of items comprise toothed racks or screw spindles securely attached to the treatment bath and which interact with gear wheels or worm gears correspondingly formed on the mounting frame.

This also makes it possible to insert intermediate gears if need be.

In the area of the rotary axis, the mounting frame advantageously comprises guide means which are guided in the guide rails. This brings about the continuous translational movement with utmost accuracy on to the mounting frame in the direction predetermined by the guide rails.

Rollers are particularly provided as guide means in the guide rails because the friction is therefore minimized, which is important in the case of several sequentially arranged mounting frames connected together.

By arranging receivers on the mounting frame, workpieces can be secured thereon in a directly detachable manner, or indirectly for example in the case of vehicle bodies that are detachably secured on a skid.

By having the receivers assume a position that remains unaltered in the movement of direction with respect to a vertical direction during the mounting frame's translational movement, it is extremely simple to mount a vehicle body using a skid by way of adjacent conveying means located at the same height.

All the drive means known from the prior art can be used for the continuous movement of the individual workpieces. In particular, chain drives, traction rope arrangements, threaded rods or self-propelled mounting frames that have their own drive are perfectly suitable.

The angle data given in this application should not be regarded as absolute values. Values that deviate by ±10% are also covered by the disclosure.

BRIEF DESCRIPTION OF THE INVENTION

With reference to the enclosed drawings, several exemplary embodiments will be described and explained in more detail so as to explain the invention further and to understand it better.

Figure 2:
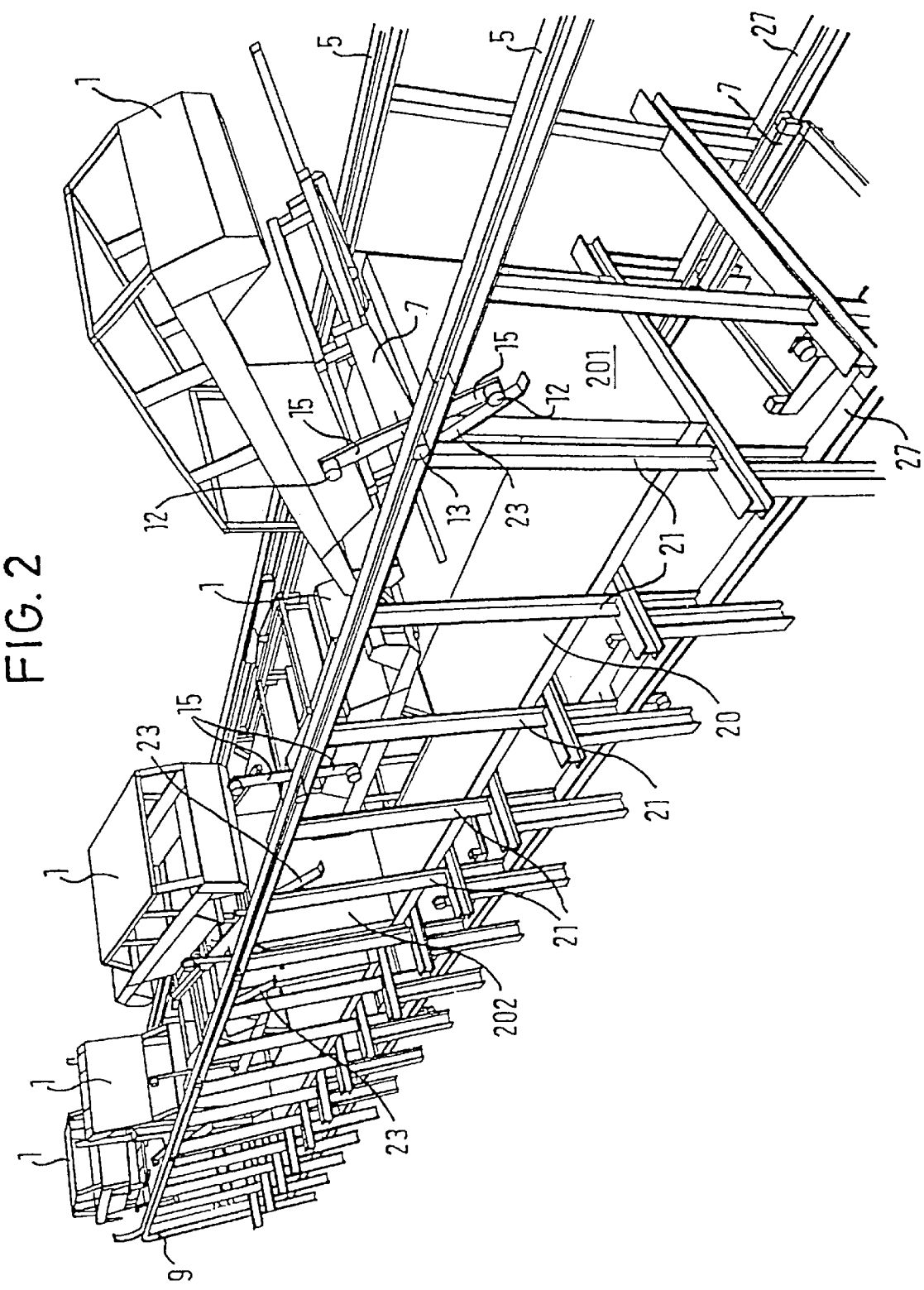
Figure 3:
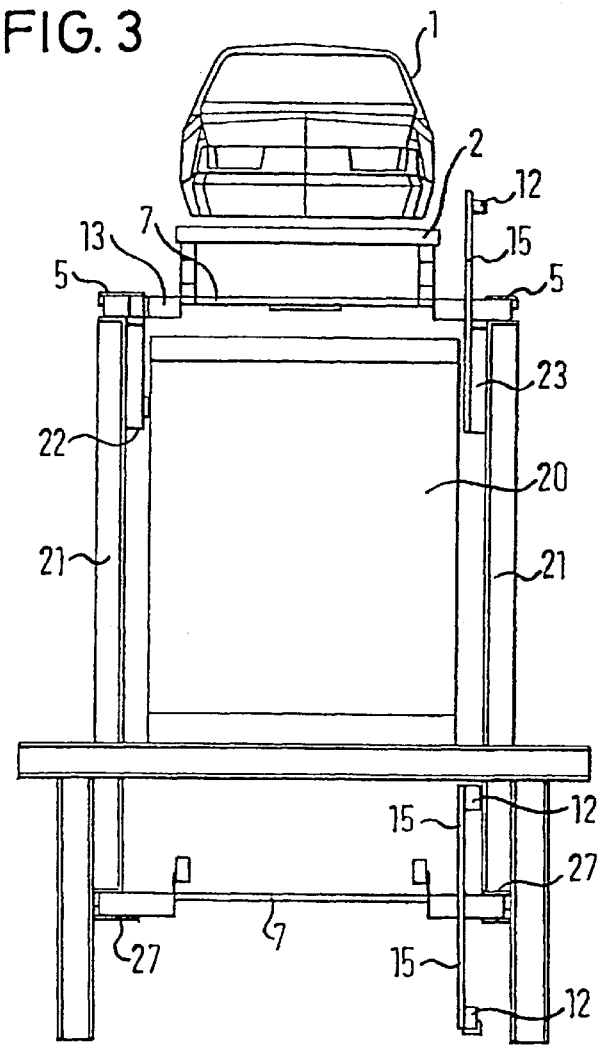
Figure 5:
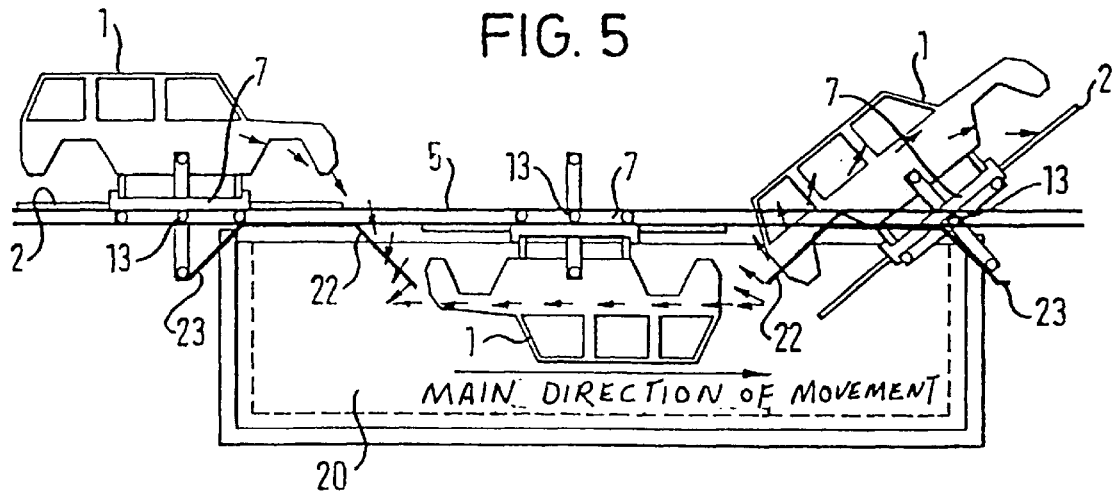
Figure 4:
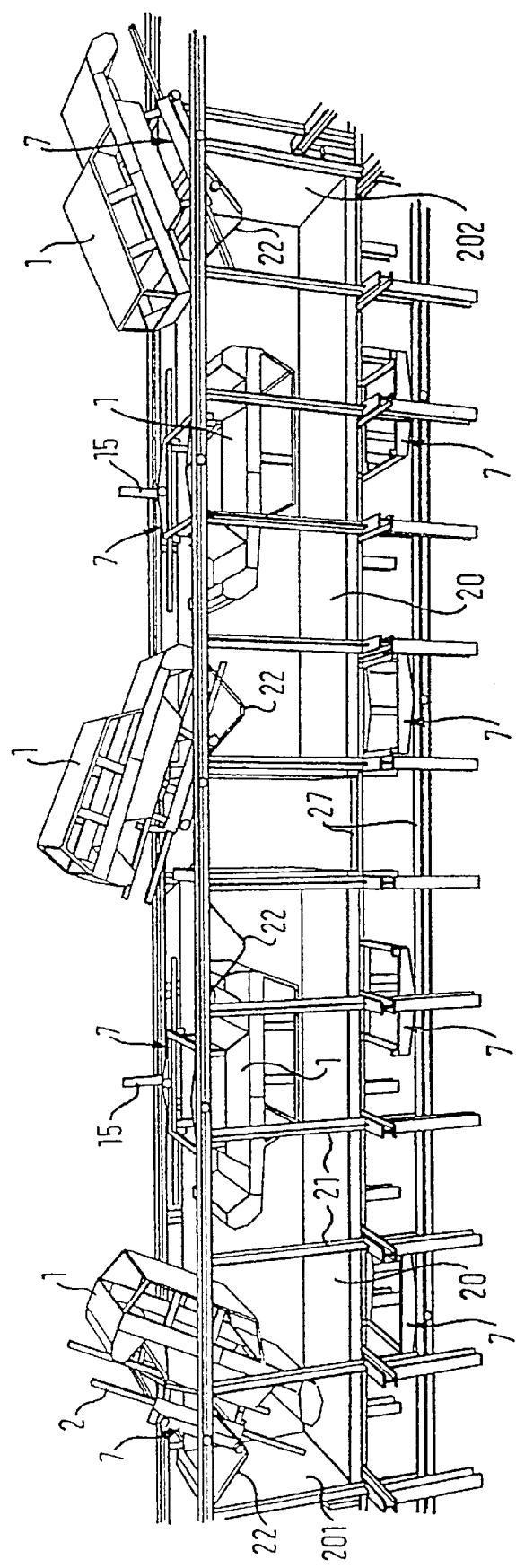
Figure 6:
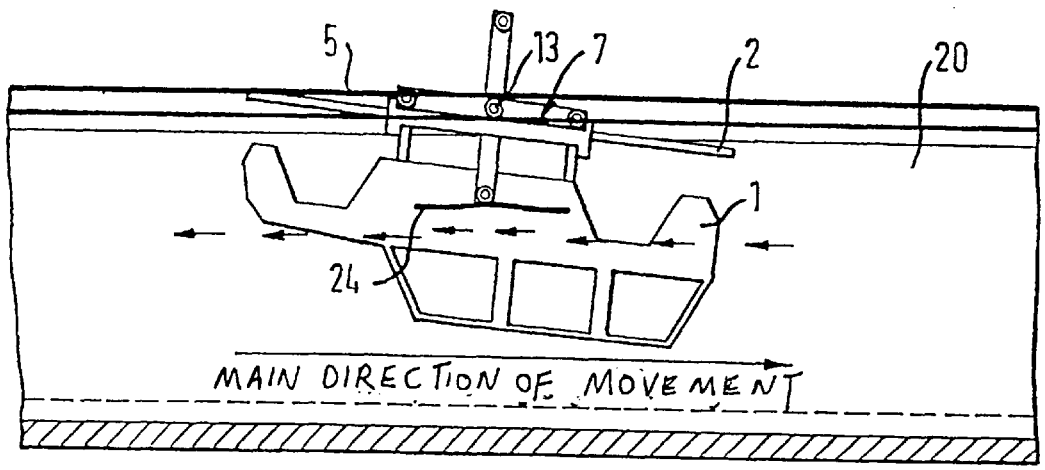
Figure 7:
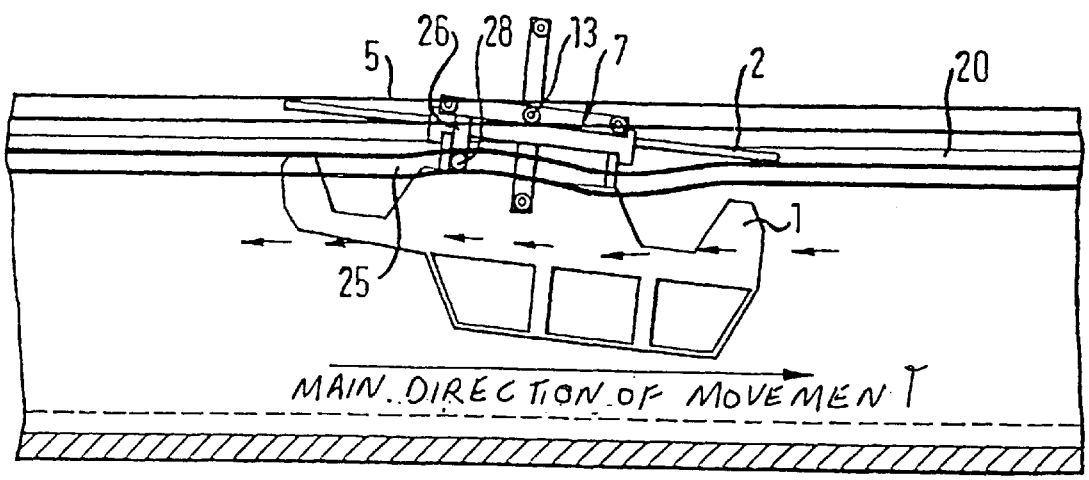
Figure 8:
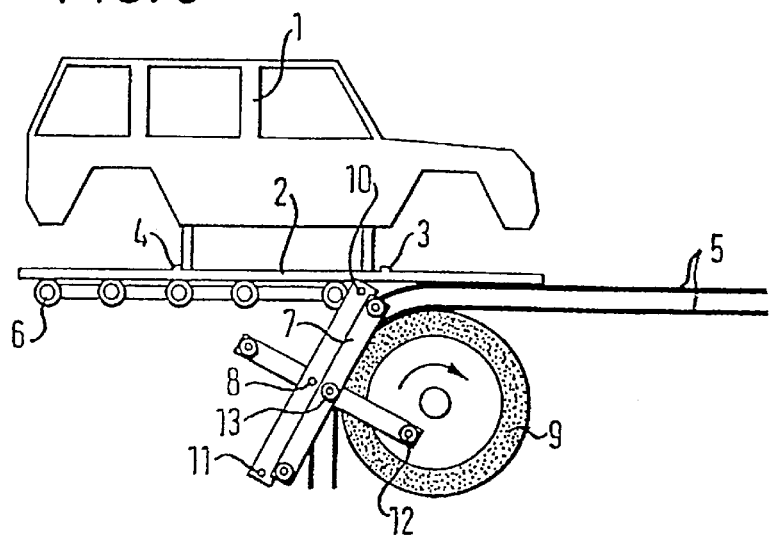
Figure 9:
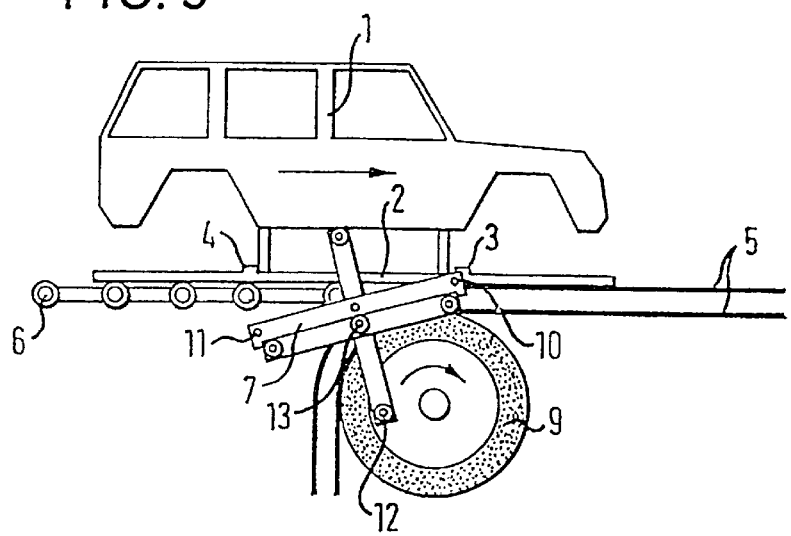
Figure 10:
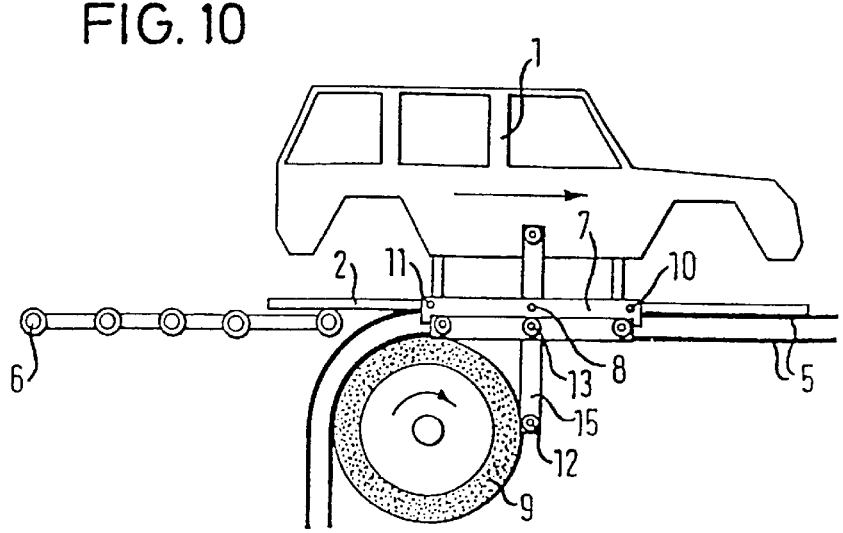
Figure 11:
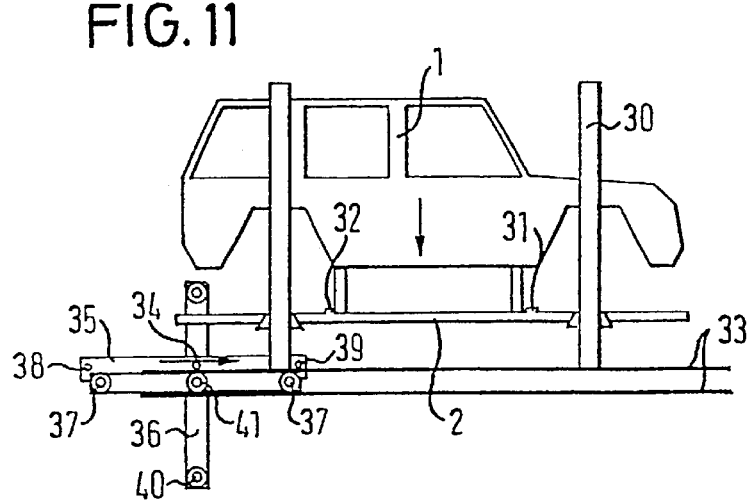
Figure 12:
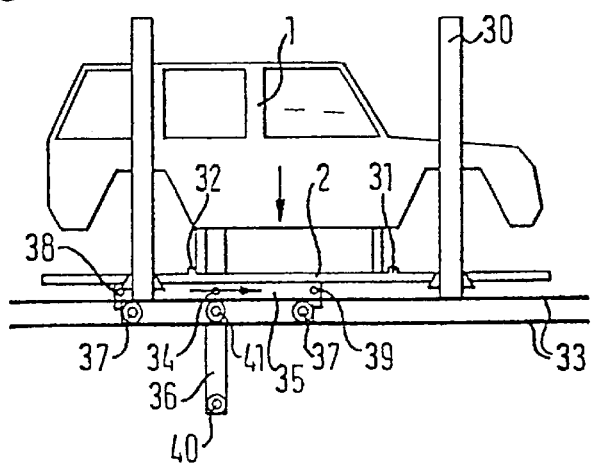
Figure 13:
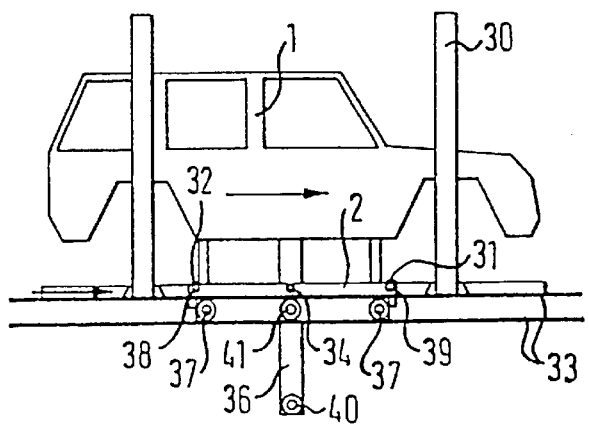
Figure 14:
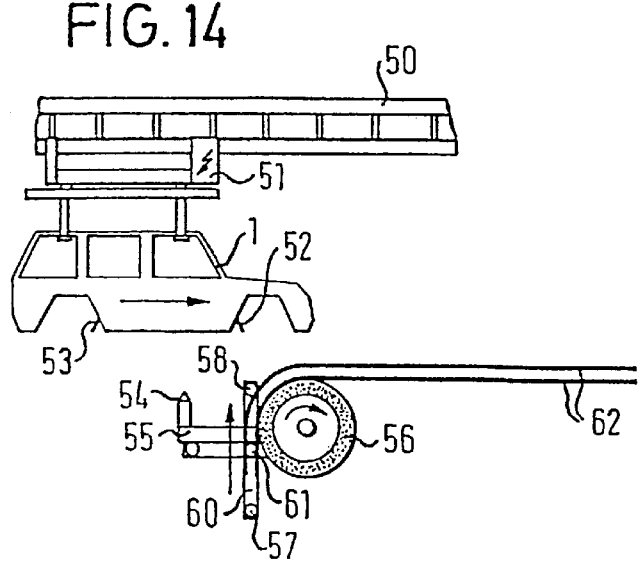
Figure 15:
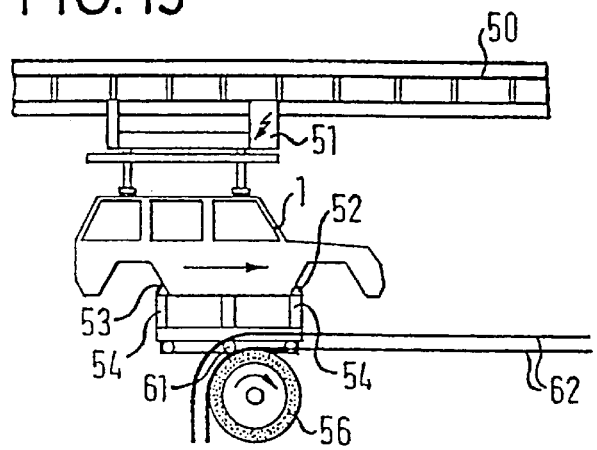
Figure 16:
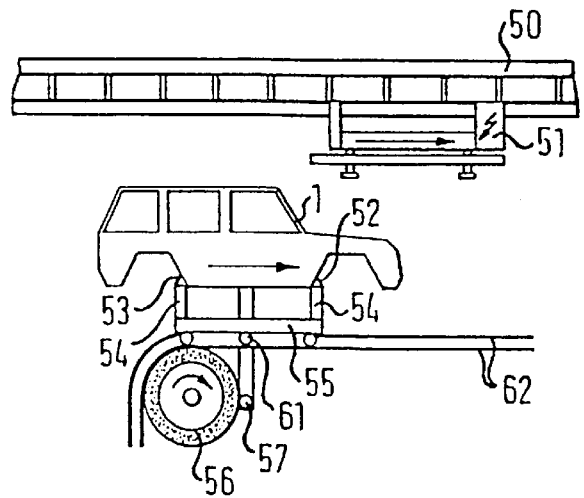
Figure 17:
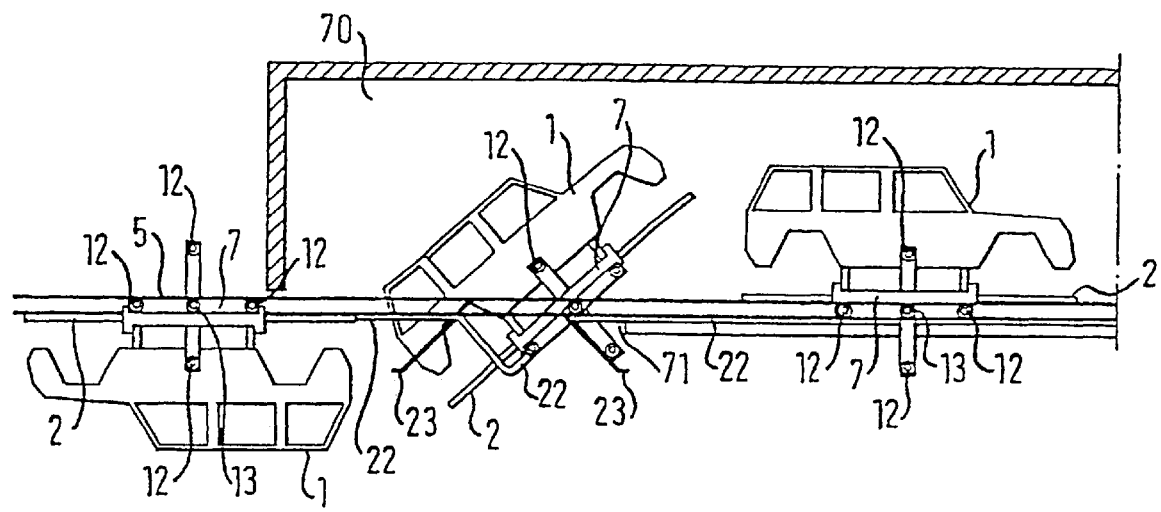
Figure 18:
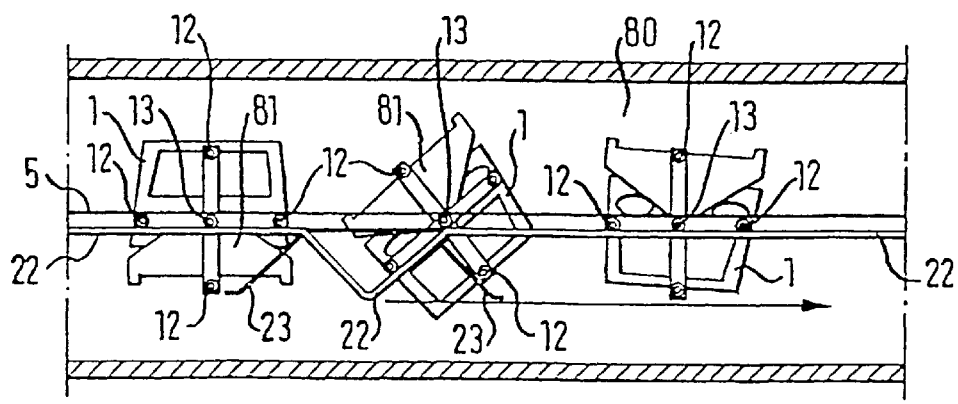

FIG. 1 shows a schematic, perspective side view of a system according to the invention in relation to the direction of conveyance of individual vehicle bodies, viewed from the right-hand side, FIG. 2 shows a schematic, perspective side view of the system according to the invention in FIG. 1 when viewed from the direction of conveyance of the vehicle bodies on the left-hand side, FIG. 3 shows a cross-sectional view through a system according to the system in FIGS. 1 or 2, FIG. 4 shows a schematic, direct side view of the system according to the invention in FIGS. 1 to 3, FIG. 5 shows a side view of the system according to the invention, in which the dipping process into and raising process out of a treatment bath is schematically depicted, FIG. 6 shows a side view of another embodiment of the system according to the invention, with an additional control guide for pivoting the vehicle bodies, FIG. 7 shows a side view of a vehicle body dipped into the treatment bath in a system according to the invention in a further embodiment with special control guide rails for pivoting the vehicle bodies, FIGS. 8–10 show a depiction of the sequence of horizontally mounting a vehicle body on a skid on to a system according to the invention, FIGS. 11–13 show a sequential depiction of vertically mounting a vehicle body supported on a skid on to a system according to the invention, FIGS. 14–16 show a schematic sequential depiction of mounting a vehicle body without interposing a skid on a purpose-built device according to the system according to the invention, FIG. 17 shows a schematic side view of a dryer in which a height difference between a base level and dryer level is overcome by rotating the vehicle bodies, and FIG. 18 shows a schematic side view of a paint dryer in which a rotation of the vehicle bodies is brought about during a continuous translational movement of vehicle bodies.

DESCRIPTION OF THE PREFERRED EMBODIMENT

1st Embodiment

Structure:

A first embodiment of the system according to the invention is shown in FIGS. 1 to 5. Guide rails 5 extend above a plurality of successively connected treatment baths 20 at the sides thereof. The guide rails 5 are spaced apart from one another and are disposed in parallel above the treatment baths 20. When viewed in cross section, they each comprise two lateral guide surfaces located on top of one another. The guide rails 5 extend downwards at the end of such an alignment of treatment baths 20 and terminate in return rails 27 disposed beneath the treatment baths 20. Deflectors 9 are arranged at the reversal points between upper guide rails and lower return rails 27.

Drive means that are not depicted here, such as driven chains, traction ropes, gear rods or the like, extend within the guide rails 5. These drive means are deflected via the deflectors 9 or other means mated therewith toward the return rails 27 and run back in the return rails 27. A motor not depicted here continuously drives these drive means at a variable speed.

Individual vehicle bodies 1 are each securely connected to a skid 2. Each skid 2 with a vehicle body 1 mounted thereon is detachably connected to a mounting frame 7. A plurality of these mounting frames 7, which are spaced apart, are connected to the drive means that is not depicted here and which extends between the guide rails 5 and return rails 27.

Each mounting frame comprises a rotary axis 13 which runs between the rails 5 across the direction specified by the rails 5; i.e. across the direction of movement specified by the drive means along the treatment baths 20. The rotary axis of a mounting frame 7 is guided by means of for example rollers within the guide rails 5 or the return rails 27. Two opposing levers 15 are respectively disposed with the rotary axis 13 at each side of the mounting frame 7. Two levers disposed on one side of the mounting frame 7 are offset through about 180° in relation to one another. On the opposite side of the mounting frame 7, these levers are rotated with respect to the other side through 90°. Rollers 12 are rotatably disposed at each of the ends of the levers 15.

Specially shaped, directional rails 22 are secured in the area of a side wall 201 of the treatment bath 20 at each side in the area of the upper guide rails 5. On the one side, the right-hand side in FIG. 1, a directional rail 22 is attached in the area of the side wall 201 of the treatment bath 20; this rail has a first horizontal portion, then a downwardly pointing portion angled at approximately 45°, and which then changes into a portion that faces upwards at approximately 45° with respect to a horizontal line. This directional rail 22 then extends horizontally until almost the other end wall 202 of the bath 20.

As is evident from the depiction in FIG. 2 viewed from the left-hand side, the directional rail 23 opposite the aforementioned directional rail 22 in FIG. 1 is first provided with a horizontal portion located below a guide rail 5 on the other side, i.e. here the left-hand side, viewed in the direction of movement of the vehicle bodies. This horizontal portion merges into a portion pointing upwards at about 45°. This is followed by a portion pointing downwards by about 45°.

At the end of a treatment bath 20 in the area of a side wall 202, as shown in FIGS. 1 and 2, directional rails 22, 23 are designed in the above-described manner again at both sides of the treatment bath 20.

But at least one directional rail 22, 23 is designed to extend horizontally in the area between two side walls 201, 202 of a treatment bath 20.

In summary, it should again be emphasized that in the inlet and outlet area of a treatment bath 20, directional rails 22, 23 are each placed opposite one another in a rotated arrangement in relation to two opposite sides; i.e. when an upwardly facing directional rail portion is present on the one side, the directional rail portion disposed on the opposite side of the mounting frame 7 is facing downwards.

Function:

The rollers 12 disposed at the ends of one lever 15 respectively of the mounting frames 7 roll off on to directional rails 22, 23. A vehicle body detachably secured to the mounting frame 7 and having an interposed skid 2 is rotated in the following manner by the continuous conveyance of the mounting frames 7 within the guide rails 5.

A vehicle body 1 attached to a skid 2 is already detachably secured on a mounting frame. This process will be explained in even more detail later on with reference to FIGS. 8 to 16. The mounting frame 7 with its vehicle body 1 now mounted thereon is guided in horizontal alignment by the drive means along the guide rails 5 into the inlet area of a treatment bath 20. A pair of levers 15 is vertically located on the one side of the mounting frame 7, whereas the opposite pair of levers 15 is aligned horizontally. The horizontally aligned pair of levers 15 rolls on the horizontal directional rail section 22. As a result, the mounting frame is moved in a manner that maintains the horizontal alignment. The continuous movement of the drive means causes the downwards lever 15 of the upright pair of levers 15 to roll up the short horizontal first portion of the left-hand guide rail 23 on its upper side. The opposite first lever, which previously rolled off on a horizontal guide piece of the right-hand directional rail 22, is now exactly at the kink of the right-hand directional rail 22 at which point the right-hand rail 22 bends downwards.

The continued translational movement now causes the roller 12 of the lever 15 on the left-hand side of the mounting frame 7 to run off on that portion of the left-hand directional rail that points upward at 45°. In consequence, the mounting frame 7 is rotated forward-s in the direction of the translational movement. At the same time, the roller 12 of the lever 15 located on the right-hand side rolls off on the downwardly pointing portion of the right-hand directional rail 22. The simultaneous rolling off process on the right-hand directional rail 22 and on the left-hand rail 23 causes the rotational process to be controlled and held in check at all times. The mounting frame 7 is, after all, supported on the levers 15 both in the forwards and the backwards direction in relation to the continuous movement.

The further rotational process is controlled by the other rising and falling portions of the right-hand directional rail 22 and left-hand directional rail 23. The body 1 is finally completely dipped in the treatment bath 20 and continues to be continuously conveyed within the treatment bath 20 along the guide rails 5.

At the end of the treatment bath 20, the roller 12 located at a lever 15 on the left-hand side rolls up the left-hand directional rail 23. This causes the vehicle body 1 to undergo a process of rotation out of the treatment bath 20. At the same time, a roller 12 of a lever 15 in turn rolls off on a correspondingly oppositely aligned portion of the right-hand directional rail 22. This causes the vehicle body 1 to rotate out in a complete and controlled manner.

The right-hand directional rail 22 and left-hand directional rail 23 in the area of the side walls 201, 202 of a treatment bath 20 and the simultaneous continuous conveyance of a mounting frame 7 in the rails 5 enable the side walls of the treatment bath 20 to be disposed upright or to be inclined very steeply downwards or upwards.

The lateral directional rails 22, 23 should have a gradient of 45°. Straight directional rails 22, 23 can be used in this case without producing any major fluctuations in angular velocity during rotation.

The basic structure of a system according to the invention can be easily identified from the cross-sectional view depicted in FIG. 3. Supports 21 on which the guide rails 5 extend are located next to the treatment bath 20. As already explained in detail, the mounting frames 7 with the vehicle bodies 1 mounted thereon and secured via a skid 2 are conveyed within these guide rails 5. The mounting frames 7, on which levers 15 are provided with rollers 12 located thereon, comprise a rotary axis 13. The rollers 12 roll off on directional rails 22 and 23.

Beneath the treatment bath, the mounting frames in return rails 27 are returned to their original position, as is particularly apparent from FIG. 3.

2nd Embodiment

Structure:

Another embodiment of the system according to the invention is evident from FIG. 6. In the embodiment of the device according to the invention depicted in FIG. 6, an additional control guide rail 24 is disposed in the region of the treatment bath 20. In contrast to the aforementioned first embodiment of the invention—in which in that area of the treatment bath 20 where the vehicle body 1 is transported through in a completely rotated manner and dipped in the medium of the treatment bath 20 and where the levers 15 were horizontally guided on one of the directional rails 22, 23, thereby making it impossible to rotate the vehicle body 1 into this region of the treatment bath 20—the directional rail 22 or 23 is now complemented in this area by an additional guide rail 24. In the side view, the directional rail 22 or 23 and the guide rail 24 have a repeatedly curved pattern.

Function:

One of the lever arms with the roller 12 rolls off on this guide rail 24, so that the entire mounting frame with its vehicle body 1 mounted thereon is slightly pivoted to and fro in relation to the rotary axis 13 as a result of the curved pattern of the control guide rail 24. This makes it possible to rock the vehicle body within the treatment bath, which results in the further reduction of trapped air bubbles caused by the process.

3rd Embodiment

Structure:

In the third embodiment of the invention depicted in FIG. 7 and in contrast to the aforementioned embodiments, the mounting frame 7 is additionally designed with a small, laterally projecting control lever 26 at the end of which a roller 28 is rotatably secured. The roller 28 runs in a control guide rail 25 that extends along a treatment bath 20. The control guide rail 25 comprises variously curved portions, with the result that rising and falling control portions are present in the guide rail.

Function:

When the mounting frame 7 is continuously conveyed in the guide rails 5, the control roller 28 rolls off at the control lever 26 of the mounting frame 7 in the control guide rail 25. In the case of the upwardly or downwardly inclined portions of the control guide rail, the mounting frame 7 is slightly pivoted to and fro around the rotary axis 13 of the mounting frame 7. This in turn causes the vehicle body 1 to pivot to and fro, which makes it possible to reduce any air bubbles that may be trapped inside the body 1.

4th Embodiment

Structure:

FIG. 17 shows a dryer 70 in which vehicle bodies 1 attached to mounting frames 7 are supplied on the previously explained guide rails 2 at a lower level. The vehicle bodies 1 at the mounting frames 7 are suspended with their head pointing down. Directional rails 22, 23 are in turn disposed to the left and right of the guide rails 2 in the inlet area of the dryer 70. These directional rails 22, 23 correspond to those directional rails 22, 23 already explained in the first to third embodiments.

An input opening 71 is located in the inlet area of the dryer 70 in its base at the height of the guide rail 2. The vehicle bodies 1 are introduced into the dryer 70 through this inlet opening 71 by rotation through approx. 180° around the rotary axis 13 of the respective mounting frame 7.

Function:

The vehicle bodies 1 are translationally moved continuously along the guide rails 2. Rollers 12 disposed on the now horizontal levers of the mounting frame 7 roll off on the horizontally extending directional rail 22. In this way, the mounting frame 7 is conveyed in the horizontal position with the vehicle bodies 1 suspended over head. As soon as the directional rail 23 is reached, the roller 12 of a vertical lever runs up to it and the mounting frame 7 together with the vehicle body 1 located thereon is rotated clockwise—in the side view represented in FIG. 17—through the inlet opening 71 into the dryer 70. The mounting frame is then continuously moved along the guide rails 2 in the dryer 70, whereby the rollers 12 which are now located on the horizontally aligned levers roll off on the horizontally shaped directional rail 22.

Directional rails 22, 23 are in turn arranged in the outlet area, which is not depicted here in FIG. 17, and there is an outlet opening through which the vehicle bodies 1 are rotated out of the dryer 70 by another clockwise rotation.

5th Embodiment

Structure:

In the side view of a dryer depicted in FIG. 18, the directional rails 22, 23 that were also used in the other aforementioned embodiments are used to rotate vehicle bodies 1. The vehicle bodies 1 are detachably secured on mounting frames 81. The mounting frames in turn comprise a number of levers, at the ends of which rollers 12 are attached. The mounting frames 81 are guided in guide rails 5 extending within the dryer chamber 80.

In contrast to the previously described mounting frames, the mounting frames 81 in use here are designed such that the rotary axis 13 of the mounting frames 81 ends up in the central area of a vehicle body. The mounting frames are equipped for this purpose with a recessed receiver that forms a kind of base trough. The vehicle bodies are also aligned along the rotary axis 13 instead of across it.

Function:

A vehicle body 1 on a mounting frame 81 is continuously moved in a horizontally aligned manner within the guide rails 5. The rollers 12 of the horizontal levers roll off on a horizontally aligned section of the directional rail 22. As soon as a roller 12 of a vertical lever rolls on to the directional rail 23 or a part that rises up it, the mounting frame is rotated clockwise here. The rollers 12 that were previously rolling off on the horizontal section of the directional rail 22 now roll off on a downwardly facing section of the directional rail 22. By designing the directional rails 22, 23, the vehicle bodies 1 are constantly rotated continuously around the rotary axis 13 of the mounting frame 81. This makes it impossible for fat edges, which would result in a loss of quality, to form on the freshly coated vehicle bodies 1.

Mounting a Vehicle Body:

Various embodiments for mounting a vehicle body onto a device according to the invention will be explained in detail by means of FIGS. 8 to 16 as follows. Each of the mounting options explained in the following can be used with a device according to the invention, as previously explained in detail.

A horizontal mounting option for a vehicle body 1 secured on a skid 2 is shown in FIGS. 8 to 10. A horizontal conveyor 6, here a roller conveyor, extends in the supply area of the guidance devices 5, i.e. in an area in which a first deflector 9 is present for the guidance device 5 or for the drive means that runs inside it. The skid 2 is equipped with front and rear receiving means 3, 4 which are designed to complement catch devices 10, 11 located on the mounting frame 7.

Explanation of the Mounting Process on to the Mounting Frame:

The mounting frame 7 with the first catch device pointing upwards is supplied to the supplied skid 2 as a result of the continuous movement of the mounting frame 7 around the deflector 9. As shown in FIG. 9, the catch device 10 reaches the front receiving means 3 of the skid 2. As a result of the continuous movement of the mounting frame 7, the skid 2 with the vehicle body 1 located thereon is now consequently pulled along by the already engaged front receiver 3 of the skid 2. As is evident from FIG. 10, the rear receiving means 4 of the skid 2 then engages with the rear catch device 11 of the mounting frame 7. In consequence, the skid 2 is now securely engaged with the mounting frame 7 and is completely pulled down by the conveyor means 6. The skid is then fixed on the mounting frame using the locking mechanism 8.

To detach the skid, which now contains a treated vehicle body 1, from the mounting frame 7 in the device's discharge area, i.e. at the end of the treatment baths 20, the reverse procedure to the described mounting process is adopted.

A vertical supply or detachment means on a mounting frame 7 according to the device according to the invention is shown in FIGS. 11 to 13.

A lift assembly 30 for skids 2 with their vehicle body 1 located thereon is disposed above guide rails 33 in which a mounting frame 35, with a design similar to the aforementioned one, is guided. This lift assembly 30 can be used to lower or raise a skid 2 vertically. Each mounting frame 35 has levers 36 at which rollers 40 are disposed. Front and rear catch means 38, 39 are securely arranged on the mounting frame. The catch means 38, 39 engage with correspondingly formed front and rear receiving means 31, 32 on the skid 2. A locking mechanism 34 is located in the area of the mounting frame's rotary axis 41.

Function of this Lift Assembly

The mounting frame 35 is continuously moved in the guide rails 33 in a horizontal alignment along the guide rails 33. As soon as a mounting frame 35 is located below the skid 2 on the lift assembly 30, the lift assembly 30 is lowered, thus enabling the front catch means 39 of the mounting frame 35 to enter the correspondingly formed front receiver 31 of the skid 2. Because the lift assembly 30 has been lowered to such an extent that the skid 2 slightly rests on the mounting frame 35, the rear catch means 38 is also engaged with the corresponding rear receiving means 32 of the skid 2 during the engagement of the front catch means 37 and is then detachably secured via the locking mechanism 34. The lift 30 is now moved upwards so as to mount a new vehicle body with skid 2 on to a mounting frame 35 located therebehind.

During unloading, the now treated vehicle body is released from the mounting frame 35 and removed upwards by means of a lift device designed as above.

FIGS. 14 to 16 show one possible way of horizontally supplying a vehicle body without a skid on to a mounting frame in a system according to the invention.

Structure:

A conveyor 50 with supports 51 that are individually moveable thereon is arranged above guide rails 62. Mounting frames 55 guided in the guide rails 62 comprise lockable front and rear catch means 54 which can be introduced into correspondingly formed front and rear receivers 52, 53 on a vehicle body 1. Such a mounting frame 55 in turn comprises lever arms 60 which are fitted with rollers 57, 58 in order to act as a guide for the purpose of rotation around a rotary axis 61 while dipping into a treatment bath 20.

Function:

A skidless vehicle body 1 is supplied by means of the conveyor 51 to a supply area of the system according to the invention where a mounting frame 55 is moved toward the body 1 from below by means of the drive means in the guide rails 62, enabling the frame's catch means 54 to engage with the receivers 52, 53 of the vehicle body 1 and allowing them to lock. The conveyor 51 releases the vehicle body and leaves the take-over area.

During delivery, a mounting frame 55 takes the vehicle body 1 to the discharge site where the vehicle body is released from the mounting frame 55 and received by the succeeding conveyor 51. The mounting frame 55 is removed downwards and the vehicle body 1 can be taken away by the succeeding conveyor 51.

What is claimed is:

1. A method of introducing and removing workpieces into and out of a treatment bath suitable for the surface treatment of said workpieces, comprising the steps of detachably securing at least one of said workpieces on a mounting frame which has a rotary axis aligned across the direction of movement of said workpieces, arranging said rotary axis such that by a turning movement around said rotary axis, said at least one workpiece is completely introduced into said treatment bath and is completely removed out of said treatment bath, respectively;

continuously moving said rotary axis translationally and at a constant speed; and simultaneously rotating said at least one workpiece at the start and at the end of said treatment bath through about 180° around said rotary axis in a controlled and always guided manner in the direction of the translational movement.

2. A method according to claim 1, comprising the step of always controlling the rotational speed by actuating means coupled with said mounting frames such that by moving of said mounting frames, said mounting frames are forced to be turned around the respective rotary axis.

3. A method of introducing and removing workpieces into and out of a treatment area suitable for the surface treatment of said workpieces, comprising the steps of detachably securing at least one of said workpieces on a mounting frame which has a rotary axis aligned across the direction of movement of said workpieces, arranging said rotary axis such that by a turning movement around said rotary axis, said at least one workpiece is completely introduced into said treatment area and is completely removed out of said treatment area, respectively;

continuously moving said rotary axis translationally and at a constant speed;

simultaneously rotating said at least one workpiece at the start and at the end of said treatment area through about 180° around said rotary axis in a controlled and always guided manner in the direction of the translational movement; and when introducing and removing said workpiece into and out of the treatment area, coordinating the rotational speed and the movement speed with one another such that after completing the rotational process, while observing a safety gap, the front section of said workpiece is positioned at a first end wall of said treatment area and said workpiece now with the front section is in turn moved, while observing a safety gap, as far as the other end wall before this workpiece is removed in the treatment area by another rotation to about 180°.

4. A device for the surface treatment of workpieces in a treatment area constituted by treatment baths or treatment booths, comprising
   at least one mounting frame for receiving one or more workpieces, said frame being continuously moveable along a direction of movement of said workpieces predetermined by the arrangement of said treatment bath or said booth, having receiving means with which said workpiece can be detachably fitted to said mounting frame and having a rotary axis disposed across the direction of movement, and arranged such that by a turning movement around said rotary axis, said at least one workpiece can be completely introduced into said treatment area and can be completely removed out of said treatment area respectively;
   actuating means for rotationally shifting said mounting frame around its rotary axis, said actuating means and said mounting frame being constantly coupled together during the process of rotation so that the rotation is always controlled and guided;
   guidance means with which said mounting frame can be guided in the direction of movement;
   drive means with which said mounting frame is continuously moveable in the direction of movement; and
      wherein said mounting frame has at least one laterally secured lever interacting with said actuating means to cause said mounting frame to rotate.

5. A device according to claim 4, wherein said at least one lever is respectively attached to opposite sides of said mounting frame, said opposite levers being offset against one another by a predetermined angular amount.

6. A device according to claim 4, wherein two levers are disposed on a side of said mounting frame, said lever arrangement being offset against one another and interacting with said actuating means to cause said mounting frame to rotate.

7. A device according to claim 4, wherein said actuating means comprises at least one directional rail.

8. A device according to claim 4, wherein a roller is disposed at the end of a lever for the purpose of guidance.

9. A device according to claim 4, wherein actuating means in the form of a motor is assigned to each mounting frame.

10. A device according to claim 4, wherein said actuating means is constituted by a securely attached toothed rack or screw spindle in the inlet and outlet area of a treatment bath and interacts with gear wheels or worm gears correspondingly formed on said mounting frame.

11. A device according to claim 4, wherein said mounting frame is guided by guidance means in said guidance device disposed in the area of said frame's rotary axis.

12. A device according to claim 11, wherein said guidance means comprise rollers.

13. A device according claim 4, wherein said mounting frame has receivers to detachably connect workpieces directly or indirectly to said mounting frame.

14. A device according to claim 4, wherein said guidance device comprises guide rails.

15. A device for the surface treatment of workpieces in a treatment area comprising treatment baths or treatment booths, comprising;
   at least one mounting frame for receiving one or more workpieces, said frame being continuously moveable along a direction of movement of said workpieces predetermined by the arrangement of said treatment bath or said booth, having receiving means with which said workpiece can be detachably fitted to said mounting frame, and having a rotary axis disposed across the direction of movement, and arranged such that by a turning movement around said rotary axis, said at least one workpiece can be completely introduced into said treatment area and can be completely removed out of said treatment area respectively;
   actuating means for rotationally shifting said mounting frame around its rotary axis, said actuating means and said mounting frame being constantly coupled together during the process of rotation so that the rotation is always controlled and guided;
   guidance means with which said mounting frame can be guided in the direction of movement;
   drive means with which said mounting frame is continuously moveable in the direction of movement; and
      wherein said actuating means comprises at least one directional rail and said directional rail comprises suitable guide surfaces in the inlet and outlet area of the treatment area for rotationally shifting said mounting frame.

16. A device according to claim 15, wherein the guide surfaces comprise upwardly and downwardly inclined guide portions.

17. A device according to claim 16, wherein the individual guide, portions are downwardly inclined by about 45°, other guide portions are upwardly inclined by about 45°.

18. A device according to claim 15, wherein said directional rails and their guide surfaces make contact with contact members attached to the end of at least one lever secured laterally to said mounting frame.

19. A device for the surface treatment of workpieces in a treatment area composing treatment baths or treatment booths, comprising:
   at least one mounting frame for receiving one or more workpieces, said frame being continuously moveable along a direction of movement of said workpieces predetermined by the arrangement of said treatment bath or said booth, having means with which said workpiece can be detachably fitted to said mounting frame, and having a rotary axis disposed across the direction of movement, and arranged such that by a turning movement around said rotary axis, said at least one workpiece can be completely introduced into said treatment area and can be completely removed out of said treatment area respectively;
   actuating means for rotationally shifting said mounting frame around its rotary axis, said actuating means and said mounting frame being constantly coupled together during the process of rotation so that the rotation is always controlled and guided;
   guidance means with which said mounting frame can be guided in the direction of movement;
   drive means with which said mounting frame is continuously moveable in the direction of movement; and
      wherein said mounting frame has receivers to detachably connect workpieces directly or indirectly to said mounting frame, and comprising at least one of the following (i)–(iii):
         (i) said receivers comprise catch means which engage with corresponding receiving seats;

(ii) said receivers are attached to said mounting frame such that their position is variable with respect to a vertical direction; and (iii) said receivers assume a position which remains unaltered with respect to a vertical direction during the translational movement of sub-mounting frame.

20. A system for the surface treatment of workpieces comprising a plurality of successively arranged areas comprising baths or booths;

a supply means for supplying said workpieces individually in an inlet area;

a device for the surface treatment of workpieces in said treatment areas, with at least one mounting frame for receiving one or more workpieces, said frame being continuously moveable along a direction of movement of said workpieces predetermined by the arrangement of said treatment area, having receiving means with which said workpiece can be detachably fitted to said mounting frame, and having a rotary axis disposed across the direction of movement, and arranged such that by a turning movement around said rotary axis, said at least one workpiece can be completely introduced into said treatment area and can be completely removed out of said treatment area respectively;

actuating means for rotationally shifting said mounting frame around its rotary axis, said actuating means and said mounting frame being constantly coupled together during the process of rotation so that the rotation is always controlled and guided;

guidance means with which said mounting frame can be guided in the direction of movement; and drive means with which said mounting frame is continuously moveable in the direction of movement;

wherein such plurality of spaced apart mounting frames is continuously moved above said plurality of successively arranged treatment areas;

such supply means comprise means for individually supplying the workpieces in said inlet area in accordance with the movement speed of said mounting frames; and in an outlet area of said system, means are provided for detaching and moving the now treated workpieces from said mounting frames while continuously moving said frames.

21. A system according to claim 20, wherein said mounting frames are returnable from the outlet area to the inlet area of said system above the treatment areas.

22. A system according to claim 20, wherein said mounting frames are returnable from the outlet area to the inlet area of said system below the treatment areas.

23. A system according to claim 20, wherein said mounting frames are returnable from the outlet area to the inlet area of said system to the side of the treatment areas.

24. A system according to claim 20, wherein said guidance means are disposed above and below said treatment areas and are infinitely circulating as a result of deflection means in the system's inner and outlet areas.

25. A system for the surface treatment of workpieces comprising a plurality of successively arranged treatment booths;

a supply means for supplying said workpieces individually in an inlet area;

a device for the surface treatment of workpieces in said treatment booths, having at least one mounting frame for receiving one or more workpieces, said frame being continuously moveable along a direction of movement of said workpieces predetermined by the arrangement of said treatment booths, having receiving means with which each said workpiece can be detachably fitted to said mounting frame, and having a rotary axis disposed across the direction of movement, and arranged such that by a turning movement around said rotary axis, said at least one workpiece can be completely introduced into said treatment booth and can be completely removed out of said treatment booth respectively;

actuating means for rotationally shifting said mounting frame around its rotary axis, said actuating means and said mounting frame being constantly coupled together during the process of rotation so that the rotation is always controlled and guided;

guidance means with which said mounting frame can be guided in the direction of movement; and drive means with which said mounting frame is continuously moveable in the direction of movement;

wherein said plurality of spaced apart mounting frames is continuously moved above said plurality of successively arranged treatment booths;

said supply means comprise means for individually supplying the workpieces in said inlet area in accordance with the movement speed of said mounting frames; and in an outlet area of said system, means are provided for detaching and removing the now treated workpieces from said mounting frames while continuously moving said frames.

* * * * *